United States Patent
Su et al.

(10) Patent No.: US 8,779,747 B2
(45) Date of Patent: Jul. 15, 2014

(54) DYNAMIC VOLTAGE ADJUSTMENT DEVICE AND POWER TRANSMISSION SYSTEM USING THE SAME

(75) Inventors: Chih-Heng Su, Hsinchu (TW); Chih-Yuan Chen, Hsinchu (TW); Ciou-Fong Li, New Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 229 days.

(21) Appl. No.: 13/437,011

(22) Filed: Apr. 2, 2012

(65) Prior Publication Data

US 2013/0162226 A1    Jun. 27, 2013

(30) Foreign Application Priority Data

Dec. 21, 2011    (TW) .............................. 100147724 A (51) Int. Cl.
*H02M 3/156*    (2006.01)

(52) U.S. Cl.
USPC .......................................... 323/285; 323/909

(58) Field of Classification Search
USPC .................. 323/234, 265, 282, 285, 351, 909
See application file for complete search history.

(56) References Cited

U.S. PATENT DOCUMENTS

| | | | | |
|---|---|---|---|---|
| 5,508,603 A | * | 4/1996 | Strong, III | 323/234 |
| 5,917,312 A | * | 6/1999 | Brkovic | 323/282 |
| 5,977,757 A | * | 11/1999 | Felps | 323/282 |
| 6,580,256 B1 | * | 6/2003 | Martindale et al. | 323/280 |
| 6,693,450 B1 | | 2/2004 | Volk | |
| 6,947,865 B1 | | 9/2005 | Mimberg | |
| 7,212,012 B1 | * | 5/2007 | Zhang | 324/611 |
| 7,701,189 B2 | | 4/2010 | Gehrke | |
| 8,138,736 B2 | * | 3/2012 | Naden | 323/285 |
| 8,258,767 B2 | * | 9/2012 | Wu et al. | 323/282 |
| 2008/0224683 A1 | | 9/2008 | Huang | |
| 2008/0258697 A1 | | 10/2008 | Gehrke | |
| 2011/0101937 A1 | | 5/2011 | Dobkin | |

FOREIGN PATENT DOCUMENTS

| | | |
|---|---|---|
| TW | 200837279 | 9/2008 |
| TW | I334692 | 12/2010 |
| TW | 201112577 | 4/2011 |
| TW | I344079 | 6/2011 |

* cited by examiner

*Primary Examiner* — Gary L Laxton
(74) *Attorney, Agent, or Firm* — Winston Hsu; Scott Margo (57) ABSTRACT

The present invention discloses a dynamic voltage adjustment device for dynamically adjusting an output voltage of a power transmission system which generates the output voltage according to a feedback signal and a reference signal and transmits the output voltage to a remote load via a transmission line to generate a load current. The dynamic voltage adjustment device comprises a first signal terminal, for receiving a first signal corresponding to a forward transmission voltage drop of the transmission line; a second signal terminal, for receiving a second signal corresponding to a reverse transmission voltage drop of the transmission line; a third signal terminal for receiving a reference voltage; a feedback circuit, for generating a feedback signal according to the first signal; and a adder circuit, for generating the reference signal according to the second signal and the reference voltage.

14 Claims, 10 Drawing Sheets

DYNAMIC VOLTAGE ADJUSTMENT DEVICE AND POWER TRANSMISSION SYSTEM USING THE SAME

BACKGROUND OF THE INVENTION

1. Field of the Invention

The present invention relates to a dynamic voltage adjustment device and related power transmission system, and more particularly, to a dynamic voltage adjustment device and related power transmission system capable of ensuring a voltage difference across a remote load being stable when transmitting electricity to the remote load.

2. Description of the Prior Art

Generally, a power system transmits electricity to a remote load via a medium such as a transmission line (e.g. a coaxial cable and a conducting line). However, realistic transmission lines have different non-ideal transmission impedances resulting in different transmission voltage drops when transmitting currents to the remote load through the transmission lines. The different transmission voltage drops may cause the remote load damaged or operated unstably.

Figure 1:
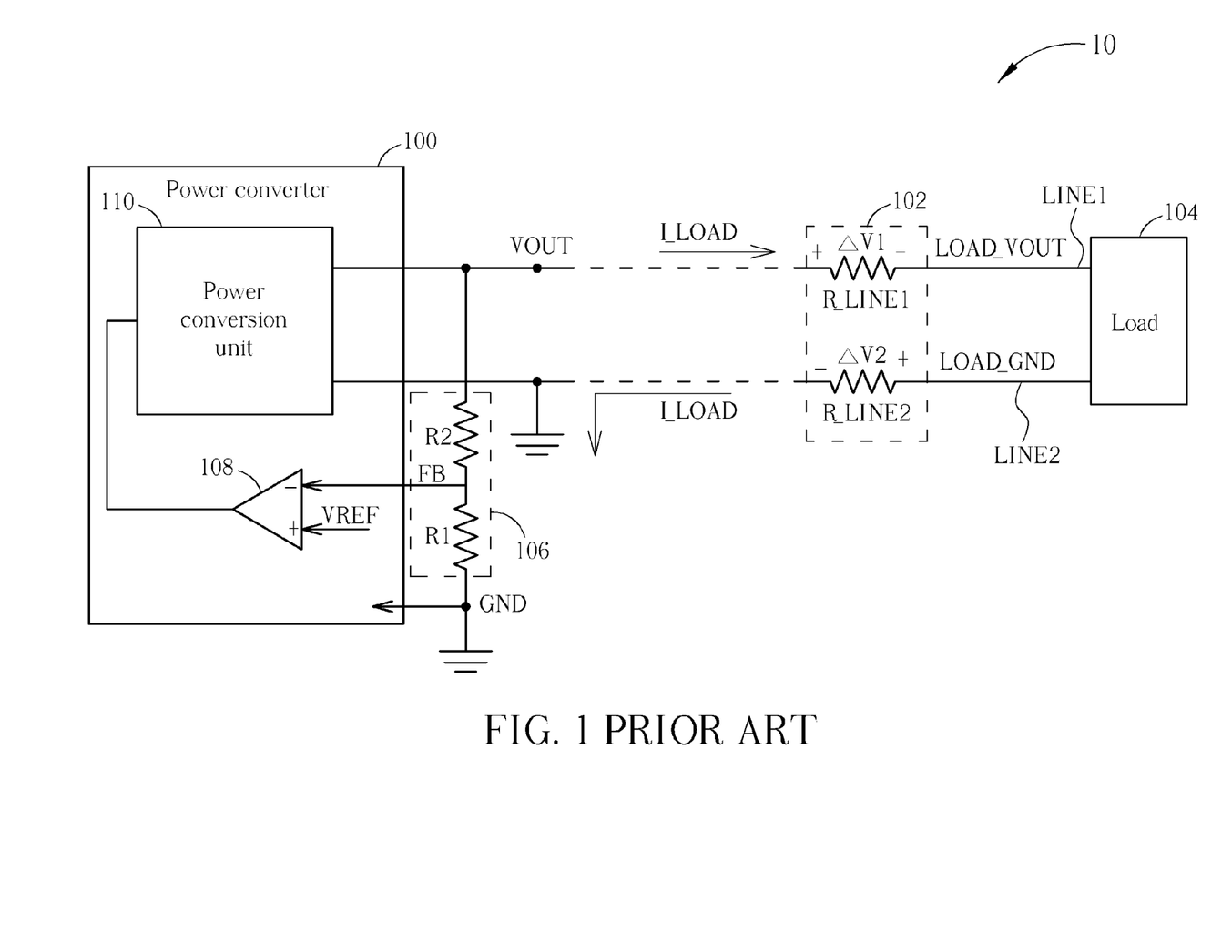
FIG. 1 is a schematic diagram of a conventional power transmission system.

Pleases refer to FIG. 1, which is a schematic diagram of a conventional power transmission system 10. The power transmission system 10 comprises a power converter 100, a transmission line 102, a load 104 and a feedback circuit 106. The power transmission system 10 is utilized for transmitting an output voltage VOUT generated by the power converter 100 to the load 104 through the transmission line 102. The power converter 100 comprises an error amplifier 108 and a power conversion unit 110. The power converter 100 utilizes the error amplifier 108 for comparing a difference between a reference voltage VREF and a feedback signal FB from the feedback circuit 106, such that the power conversion unit 110 generates the stable output voltage VOUT. The transmission line 102 comprises a forward transmission line LINE1 and a reverse transmission line LINE2, which are respectively utilized for a forward transmission from the power converter 100 to the load 104 and a reverse transmission from the load 104 to the power converter 100. The feedback circuit 106 consists of resistors R1, R2 and divides the voltage of the output voltage VOUT to acquire the feedback signal FB, i.e.

$$FB = \left(\frac{R2}{R1}\right) \times VOUT.$$

When the power converter 100 starts providing the output voltage VOUT to the load 104, a load current I_LOAD is generated on the forward transmission line LINE1 and the reverse transmission line LINE2. Since the forward transmission line LINE1 and the reverse transmission line LINE2 respectively have a forward transmission line resistance R_LINE1 and a reverse transmission line resistance R_LINE2, a forward voltage difference $\Delta V1=I\_LOAD*R\_LINE1$ and a reverse voltage difference $\Delta V2=I\_LOAD*R\_LINE2$ are respectively generated when the load current I_LOAD flows on the forward transmission line LINE1 and the reverse transmission line LINE2. In other words, a voltage drop equal to the forward voltage difference $\Delta V1$ is generated when the load current I_LOAD flows from the power converter 100 to load 104, and a voltage drop equal to the reverse voltage difference $\Delta V2$ is generated when the load current I_LOAD feedbacks from the load 104 to the power converter 100. Therefore, a load output voltage LOAD_VOUT acquired by the load 104 equals subtracting the forward voltage difference $\Delta V1$ from the output voltage VOUT of the power converter 100, i.e. LOAD_VOUT=VOUT−$\Delta V1$. Similarly, a load ground voltage LOAD_GND of a ground of the load 104 is the reverse voltage difference $\Delta V2$ higher than a ground voltage GND of a ground of the power converter 100, i.e. LOAD_GND=GND+$\Delta V2$. Therefore, at a moment of a start or an end of supplying power, the load 104 would suffer a voltage difference equal to forward voltage difference $\Delta V1$ plus reverse voltage difference $\Delta V2$. The instantaneous glitch may damage the power transmission system 10.

Since a feedback point samples the output voltage VOUT close to the power converter 100 in the power transmission system 10, the output voltage VOUT is a function of a difference between the reference voltage VREF and the feedback signal FB, i.e. VOUT=f(VREF−FB). Since the reference voltage VREF is a constant value and the feedback signal FB only includes information of the output voltage VOUT, the power transmission system 10 cannot acquire information of voltage difference $\Delta V1$, $\Delta V2$ generated by the load current I_LOAD flowing through the transmission line 102 and cannot accordingly adjust the output voltage VOUT of the power converter 100, such that the voltage difference $\Delta V1+\Delta V2$ generated at the load 104 cannot be adjusted.

Figure 2:
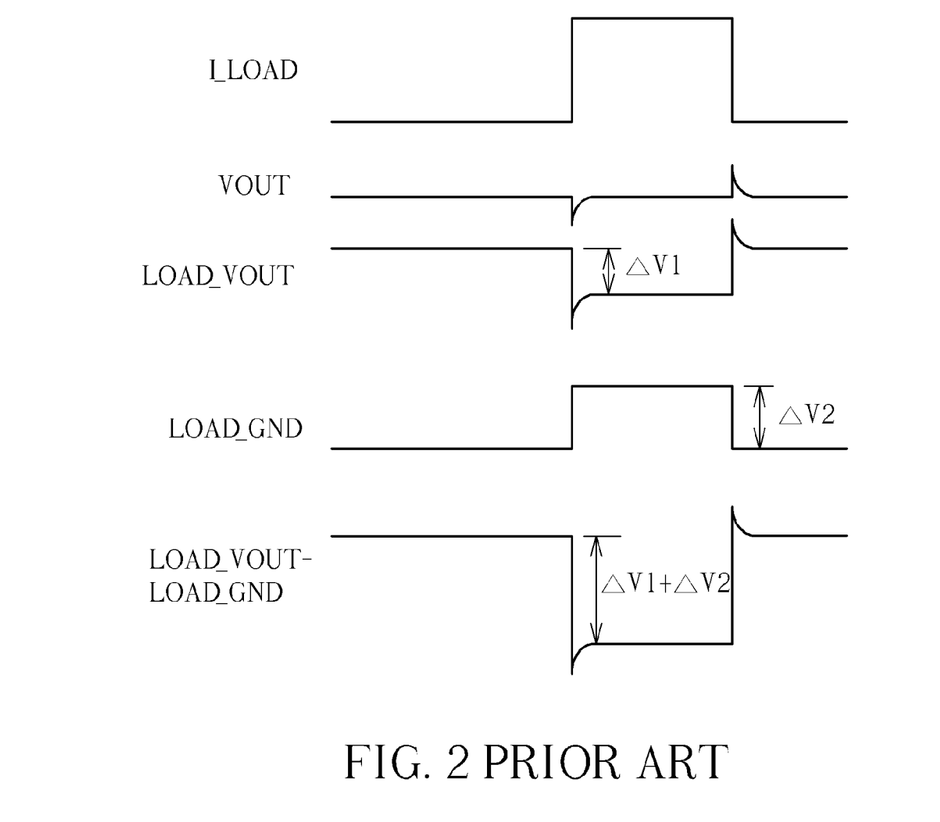
FIG. 2 is a schematic diagram of related signals when the power transmission system shown in FIG. 1 operates.

Please refer to FIG. 2, which is a schematic diagram of related signals when the power transmission system 10 operates. As shown in FIG. 2, at the moments the power transmission system 10 starts and ends providing the output load current I_LOAD to the load 104, the output voltage VOUT of the power converter 100 respectively rises and falls slightly, but the error amplifier 108 immediately senses the variation of the output voltage VOUT and recovers the output voltage VOUT to a former voltage level via a feedback mechanism. As shown in FIG. 2, during the power transmission system 10 outputting the load current I_LOAD, a voltage drop between the load output voltage LOAD_VOUT of the load 104 and the output voltage VOUT equals the forward voltage difference $\Delta V1$, and a voltage drop between the load ground voltage LOAD_GND of the load 104 and the ground voltage GND of the power converter 100 equals the reverse voltage difference $\Delta V2$. Therefore, the voltage difference across the load 104 equals a difference between the load output voltage LOAD_VOUT and the load ground voltage LOAD_GND, i.e. LOAD_VOUT−LOAD_GND. Therefore, as can be seen from FIG. 2, the load 104 suffers a voltage difference $\Delta V1+\Delta V2$ at the moments the power transmission system 10 starts and ends outputting the load current I_LOAD, which may cause the load 104 damaged. Thus, resistance of the transmission line 102 causes the power converter 100 incapable of controlling the load 104 to receive a stable voltage via the negative feedback mechanism. As a result, the load 104 would receive a voltage difference related to the resistance of the transmission line 102 and may be damaged by the voltage difference.

Therefore, for the power transmission system, how to avoid the load generating the voltage difference due to the resistance of the transmission line and allow the load to receive a stable voltage becomes a goal in the industry.

SUMMARY OF THE INVENTION

Therefore, the present invention provides a dynamic adjustment device and related power transmission system for ensuring the voltage difference across the remote load being stable when transmitting electricity to the remote load.

The present invention discloses a dynamic voltage adjustment device, for dynamically adjusting an output voltage of a power transmission system which generates the output voltage according to a feedback signal and a reference signal and transmits the output voltage to a remote load via a transmission line to generate a load current. The dynamic voltage adjustment device comprises a first signal terminal, for receiving a first signal of a forward transmission voltage drop corresponding to the transmission line; a second signal terminal, for receiving a second signal of a reverse transmission voltage drop corresponding to the transmission line; a third signal terminal, for receiving a reference voltage; a feedback circuit, coupled to the first signal terminal, for generating the feedback signal according to the first signal; and an adder circuit, for generating the reference signal according to the second signal and the reference voltage.

The present invention further discloses a power transmission system. The power transmission system comprises a remote load; a transmission line, for transmitting an output voltage to the remote load to generate a load current; a power converter, for generating the output voltage according to a feedback signal and a reference signal; and a dynamic voltage adjustment device, comprising a first signal terminal, for receiving a first signal of a forward transmission voltage drop corresponding to the transmission line; a second signal terminal, for receiving a second signal of reverse transmission voltage drop corresponding to the transmission line; a third signal terminal, for receiving a reference voltage; a feedback circuit, coupled to the first signal terminal, for generating the feedback signal according to the first signal; and an adder circuit, for generating the reference signal according to the second signal and the reference voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
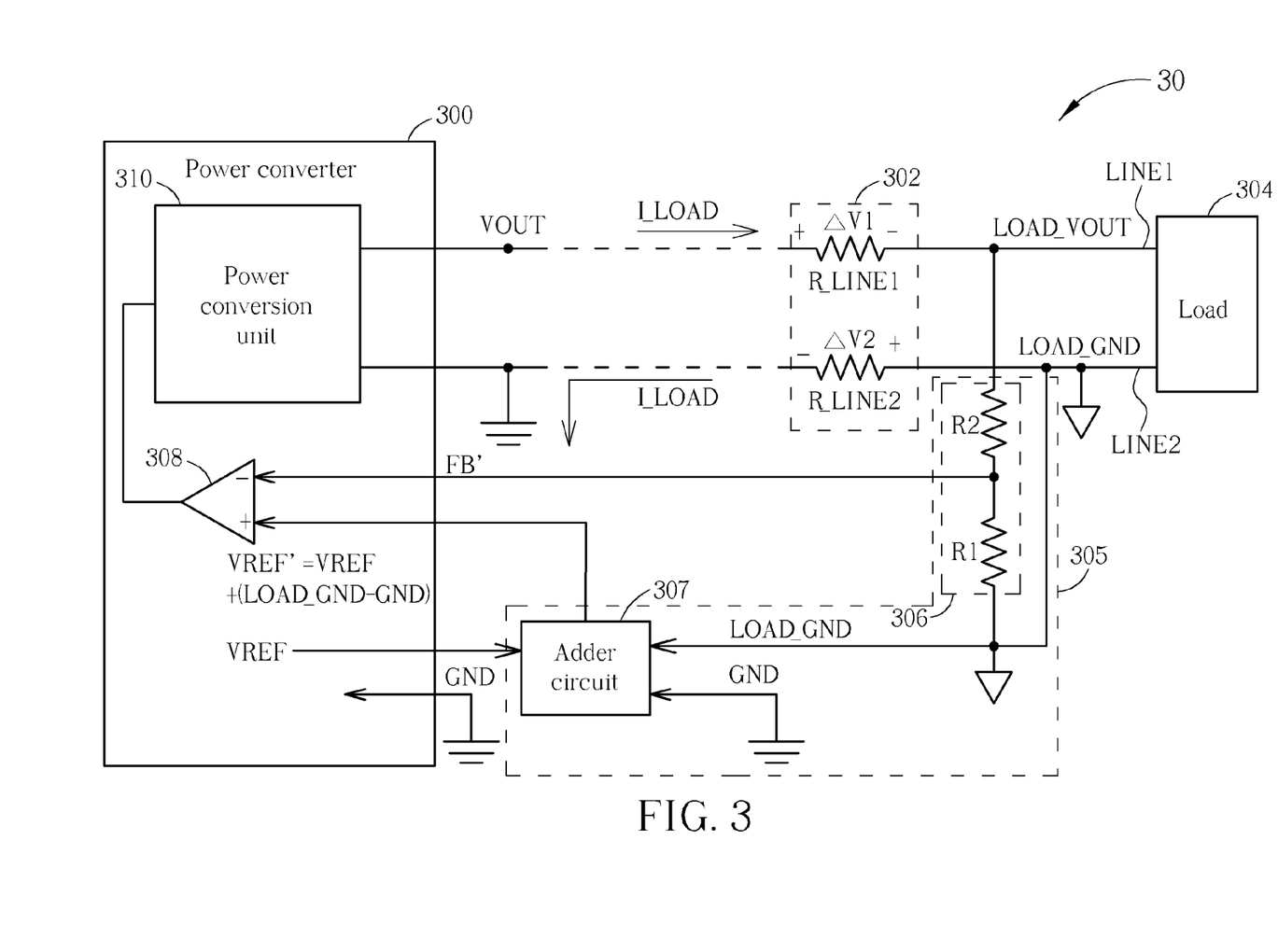
FIG. 3 is a schematic diagram of a power transmission system according to an embodiment of the present invention.

Please refer to FIG. 3, which is a schematic diagram of a power transmission system 30 according to an embodiment of the present invention. The power transmission system 30 comprises a power converter 300, a transmission line 302, a load 304 and a dynamic voltage adjustment device 305. Operating principles and architectures of the power converter 300, the transmission line 302 and the load 304 are similar to those of the power converter 100, the transmission line 102 and the load 104; thus, the same component symbols are used. The difference between the power transmission system 30 and the power transmission system 10 is that the power transmission system 30 adds the dynamic voltage adjustment device 305. The dynamic voltage adjustment device 305 respectively samples a load output voltage LOAD_VOUT and a load ground voltage LOAD_GND of the load 304 to dynamically adjust a reference voltage of the power converter 300 according to different transmission voltage drops generated on the transmission line 302 when the power transmission system 30 outputs the different load current I_LOAD, so as to control the voltage difference across the load 304 to stay stable and to avoid the unstable voltage difference causes the load 304 damaged.

In detail, as shown in FIG. 3, the dynamic voltage adjustment device 305 comprises a feedback circuit 306 and an adder circuit 307. The operating principle and architecture of the feedback circuit 306 are similar to those of the feedback circuit 106 shown in FIG. 1; thus, the same component symbols are used. However, different from the feedback circuit 106 which samples the output voltage VOUT close to the power converter 100, the feedback circuit 306 samples the load output voltage LOAD_VOUT close to the load 304 to generate a feedback signal FB' to the power converter 300. The adder circuit 307 receives the original constant value reference voltage VREF of the power converter 300, the ground voltage GND of the power converter 300 and the load ground voltage LOAD_GND of the load 304, to generate a dynamic reference voltage VREF' to the power converter 300. The load output voltage LOAD_VOUT sampled by the feedback circuit 306 and the load ground voltage LOAD_GND received by the adder circuit 307 are respectively corresponding to the forward voltage difference $\Delta V1$ and the reverse voltage difference $\Delta V2$, wherein the forward voltage difference $\Delta V1$ and the reverse voltage difference $\Delta V2$ are respectively generated on the forward transmission line LINE1 and the reverse transmission line LINE2 of the transmission line 302 when the power converter provides the load current I_LOAD to the load 304. In the prior art, a voltage difference is generated across the load 104 of the power transmission system 10 due to the transmission resistance of the transmission line 102 and may damage the load 104. In comparison, the dynamic voltage adjustment device 305 of the power transmission system 30 dynamically adjusts the reference voltage of the power converter 300 according to the transmission voltage difference corresponding to the transmission line 302, to control the voltage difference across the load 304 to stay stable and to avoid the load 304 being damaged.

Furthermore, the following explains operations of the dynamic voltage adjustment device 305 to keep the voltage difference across the load 304 stable. Since a voltage drop from the output voltage VOUT to the load output voltage LOAD_VOUT is the forward voltage difference $\Delta V1$ (i.e. LOAD_VOUT=VOUT−$\Delta V1$), the feedback signal FB' generated by the feedback circuit 306 comprises the information corresponding to the forward voltage difference $\Delta V1$ of the transmission line 302 and can be expressed as:

$$FB' = \left(\frac{R2}{R1}\right) \times (VOUT - \Delta V1)$$

In addition, since a voltage drop from the load ground voltage LOAD_GND to the ground voltage GND of the power converter 300 is the reverse voltage difference $\Delta V2$ (i.e. GND=LOAD_GND−$\Delta V2$), the adder circuit 307 can obtain the reverse voltage difference $\Delta V2$ via the load ground voltage LOAD_GND and the ground voltage GND. For example, the adder circuit 307 can obtain the reverse voltage difference ΔV2=LOAD_GND−GND via simple addition and subtraction operations. Next, the adder circuit 307 generates the dynamic reference voltage VREF' via the reference voltage VREF and the reverse voltage difference ΔV2 for the power converter 300, e.g. the adder circuit 307 obtains the dynamic reference voltage VREF'=VREF+ΔV2 via simple additions and subtractions.

Next, similar to the power converter 100, an error amplifier 308 of the power converter 300 compares the difference between the dynamic reference voltage VREF' generated by the adder circuit 307 and the feedback signal FB' outputted from the feedback circuit 306, to control a power conversion unit 310 of the power converter 300 to generate the corresponding output voltage VOUT. Since the feedback point of the power converter 300 is changed to the load output voltage LOAD_VOUT close to the load 304, the negative feedback mechanism of the power transmission system 30 keeps stability of the load output voltage LOAD_VOUT, and the voltage difference between the load output voltage LOAD_VOUT and the load ground voltage LOAD_GND is a function of the difference between the dynamic reference voltage VREF' and the feedback signal FB'. The function can be conducted as:

$$LOAD\_VOUT - LOAD\_GND =$$
$$f(VREF' - FB') = f(VREF + LOAD\_GND - FB') =$$
$$f\left[VREF + \Delta V2 - \left(\frac{R2}{R1}\right) \times (VOUT - \Delta V1)\right] =$$
$$f\left[VREF - \left(\frac{R2}{R1}\right) \times VOUT + \left(\Delta V2 + \frac{R2}{R1}\Delta V1\right)\right] =$$
$$f\left(VREF + \left(\Delta V2 + \frac{R2}{R1}\Delta V1\right) - FB\right)$$

As can be seen from the above function, a voltage offset ERROR_V exists between the voltage difference across the load 104 (i.e. LOAD_VOUT−LOAD_GND) and the output voltage VOUT, and can be expressed as:

$$ERROR\_V = \Delta V2 + \frac{R2}{R1}\Delta V1$$

As a result, the voltage offset ERROR_V can be the forward voltage difference ΔV1 plus the reverse voltage difference ΔV2 through selecting suitable resistance of the resistors R1, R2 of the feedback circuit 306. In other words, in order to keep the load output voltage LOAD_VOUT stable, the negative feedback mechanism of the power transmission system 30 forces the power converter 300 to additionally output a voltage ΔV1+ΔV2 when providing the load current I_LOAD, to compensate the forward voltage difference ΔV1 and the reverse voltage difference ΔV2 generated by the load current I_LOAD flowing through the transmission line 302.

Figure 4:
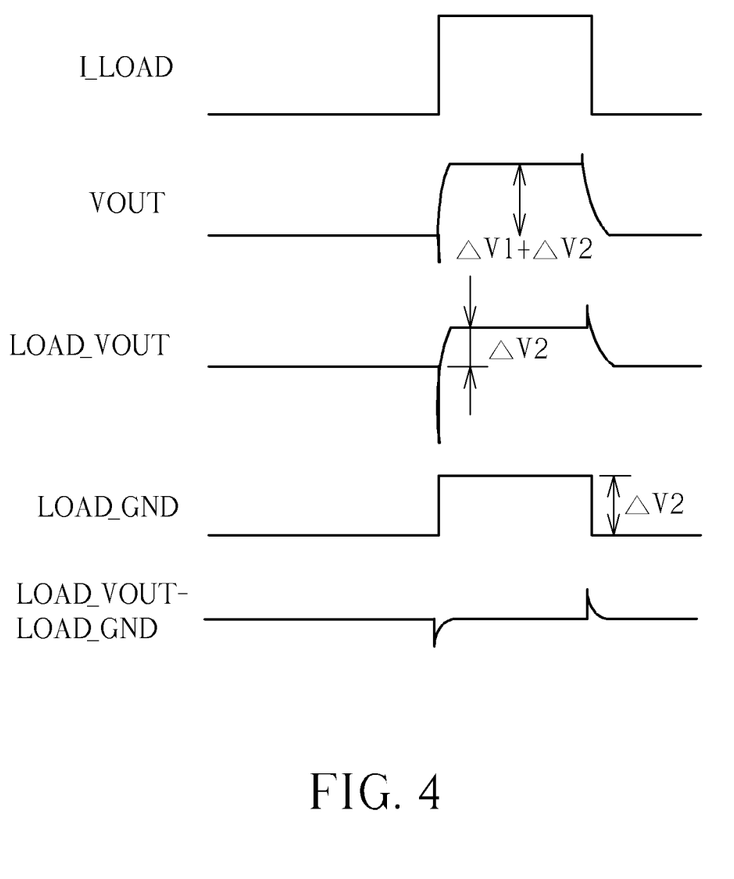
FIG. 4 is a schematic diagram of related signals when the power transmission system shown in FIG. 3 operates.

Please refer to FIG. 4, which is a schematic diagram of related signals when the power transmission system 30 operates. As shown in FIG. 4, at the moments the power transmission system 30 starts and ends outputting the load current I_LOAD to the load 304, the voltage difference across the load 304 (i.e. LOAD_VOUT−LOAD_GND) respectively reduces and increases slightly, and the error amplifier 308 immediately senses the variation and adjusts the voltage difference across the load 304 back to the former level via the negative feedback mechanism. As shown in FIG. 4, during the power transmission system 30 outputting the load current I_LOAD, the power transmission system 30 additionally outputs the output voltage VOUT with a voltage ΔV1+ΔV2 for compensating the forward voltage difference ΔV1 and the reverse voltage difference ΔV2 generated by the load current I_LOAD flowing through the transmission line 302. After the load current I_LOAD flows to the load 104 through the forward transmission line R_LINE1 of the transmission line 302, the forward voltage difference ΔV1 is generated between the output voltage VOUT and the load output voltage LOAD_VOUT; thus, the load output voltage LOAD_VOUT is greater than the output voltage VOUT by the additional compensated value ΔV2. Since the load ground voltage LOAD_GND of the load 304 is greater than the ground voltage GND by the reverse voltage difference ΔV2, the voltage difference across the load 304 (i.e. LOAD_VOUT−LOAD_GND) can be stable after the load output voltage LOAD_VOUT substrates the load ground voltage LOAD_GND. In comparison, the load 104 of the power transmission system 10 has the voltage difference related to the resistance of the transmission line 102, and the voltage difference may cause the load 104 damaged.

Therefore, the objective of the dynamic voltage adjustment device 305 shown in FIG. 3 is dynamically adjusting the reference voltage of the voltage converter 300 via respectively sampling the voltages across the load 304, such that the output voltage of the power converter 300 has a function of the voltage difference of the transmission line 302, and the voltage difference across the load 304 can stay stable. Note that, the dynamic voltage adjustment device 305 shown in FIG. 3 is not limited for a specific type of power converter but for devices such as power converters, voltage regulators and power supplies. Those skilled in the art can reasonably adjust the dynamic voltage adjustment device 305 according to different applications and requirements. For example, in another embodiment, the feedback circuit 306 can be included in the power converter 300. Furthermore, in another embodiment, as long as the adder circuit 307 can generate the signal corresponding to the voltage difference of the transmission line 302 for the power converter 300, the adder circuit 307 also can be implemented by other circuitry.

Figure 5:
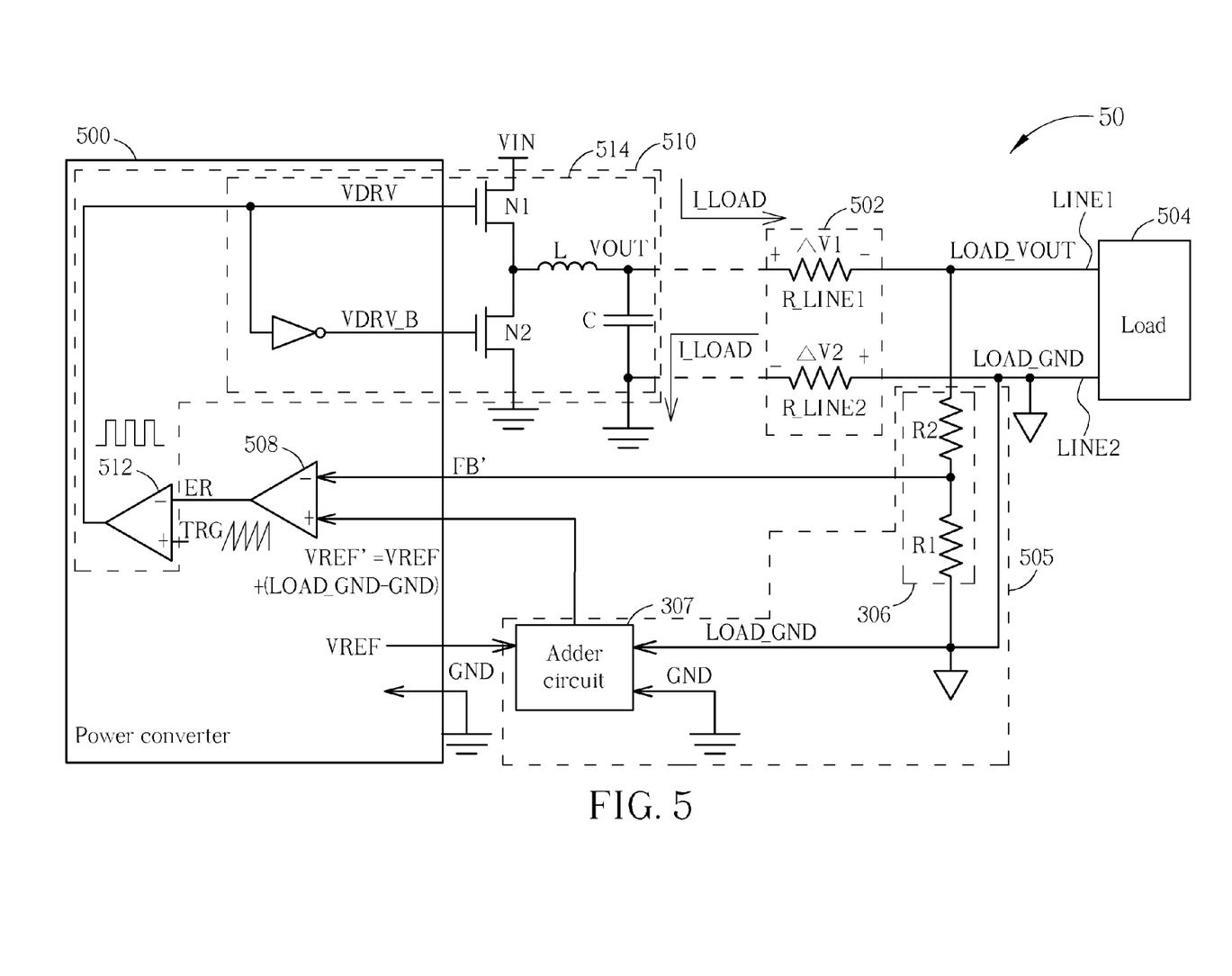
FIG. 5 is a schematic diagram of a power transmission system according to an embodiment of the present invention.
Figure 6:
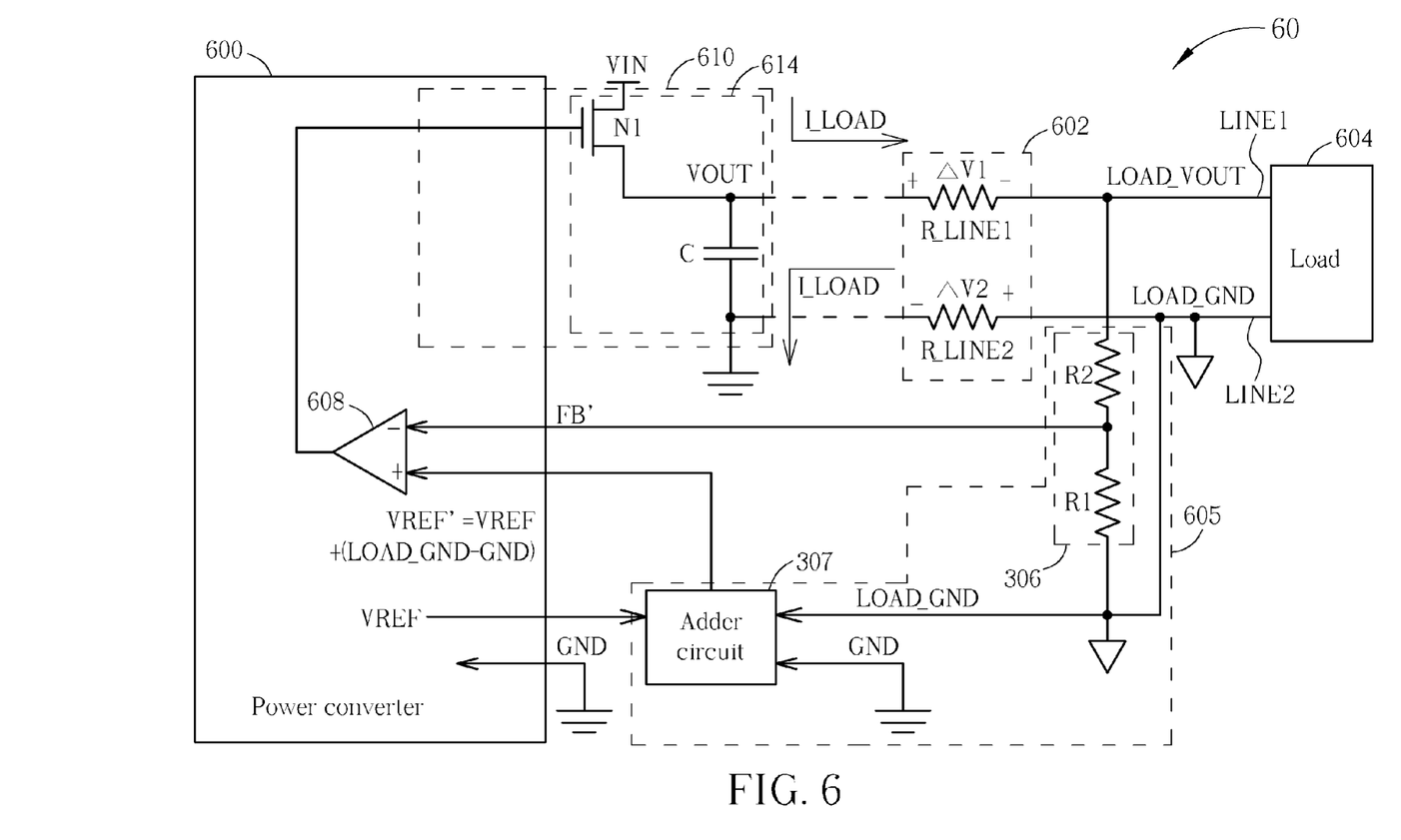
FIG. 6 is a schematic diagram of a power transmission system according to an embodiment of the present invention.
Figure 7A:
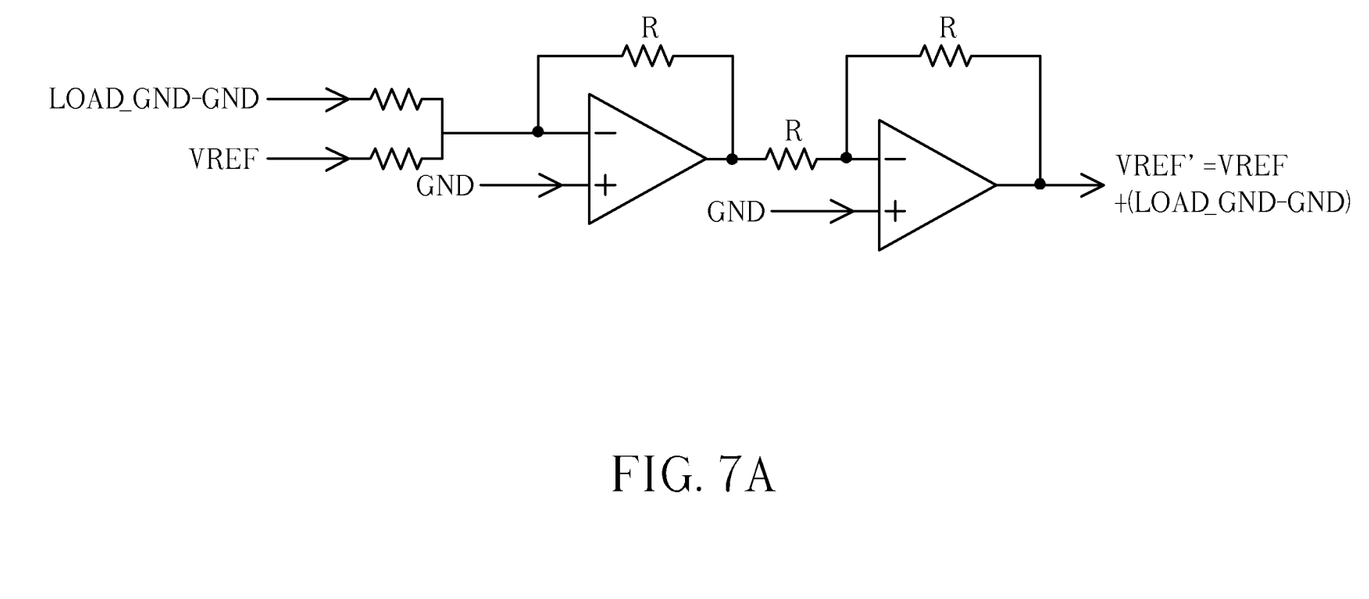
FIG. 7A~7D are detailed schematic diagram of an adder circuit of the power transmission system shown in FIG. 3 according to different embodiments.
Figure 7B:
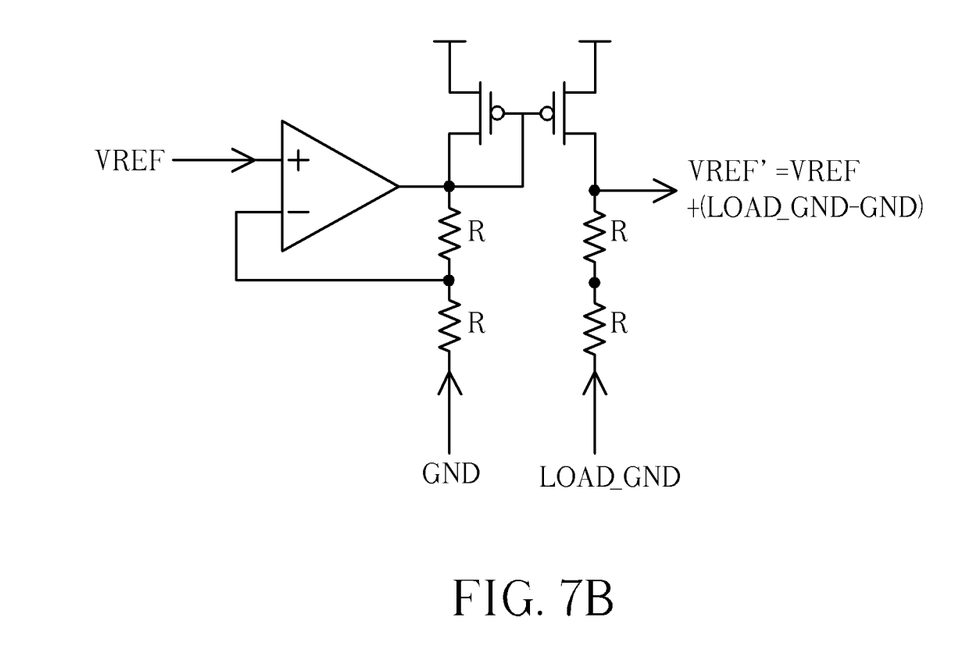
Figure 7C:
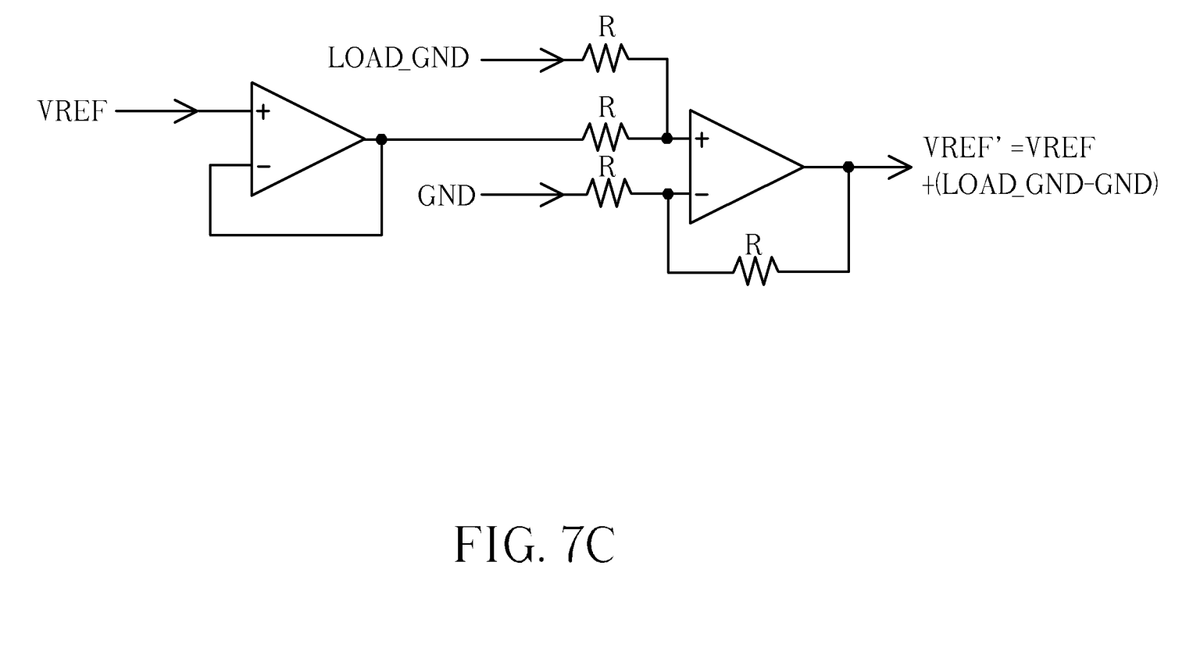
Figure 7D:
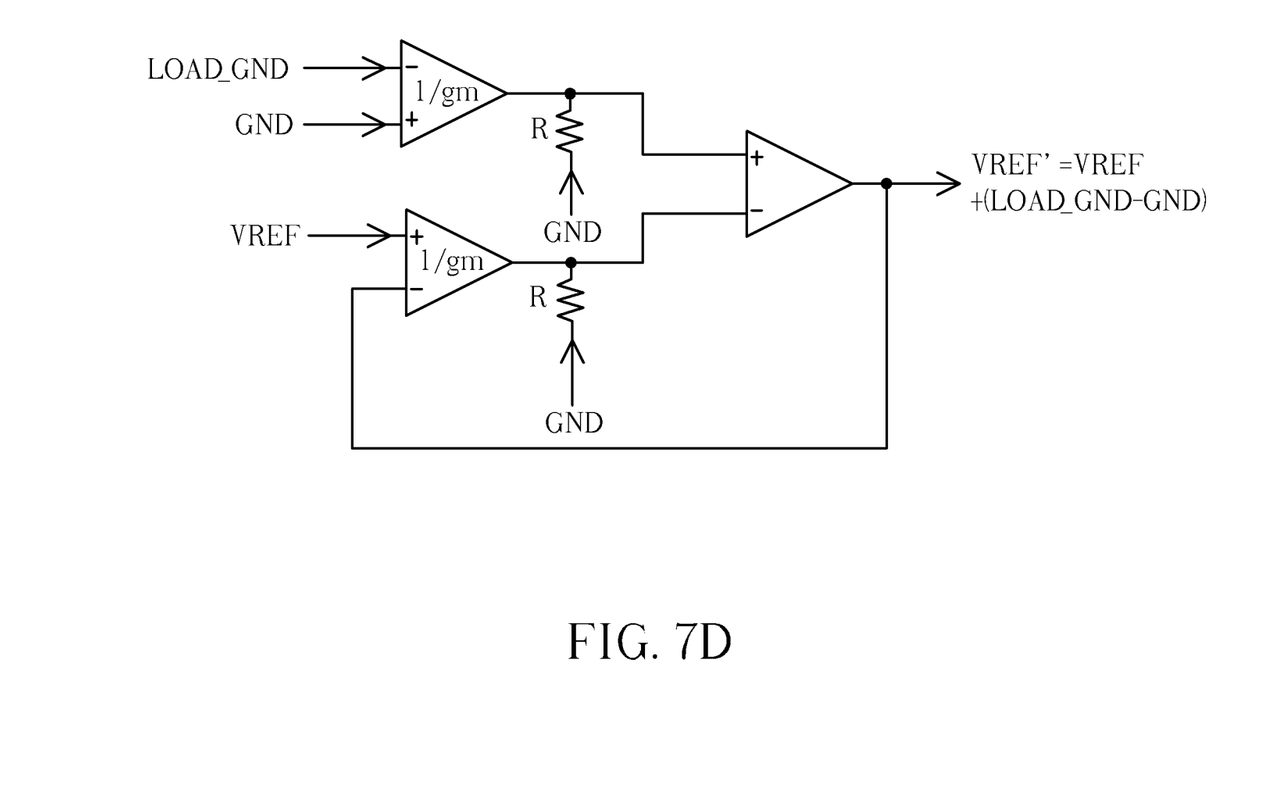

For example, please refer to FIG. 5 and FIG. 6, which are schematic diagrams of power transmission systems which reasonably adjust the dynamic voltage adjustment device 305 according to embodiments of the present invention for applying to difference types of power converter. In detail, FIG. 5 is a schematic diagram of a power transmission system 50 according to an embodiment of the present invention. The power transmission system 50 comprises a power converter 500, a transmission line 502, a load 504 and a dynamic voltage adjustment device 505. The dynamic voltage adjustment device 505 comprises the feedback circuit 306 and the adder circuit 307 shown in FIG. 3. Operating principles and architectures of the transmission line 502, the load 504 and the dynamic voltage adjustment device 505 are substantially the same as those of the transmission line 302, the load 304 and the dynamic voltage adjustment device 305 of the power transmission system 30 shown in FIG. 3; therefore, the same component symbols are used. The power converter 500 is a switching buck converter, which converts an input voltage VIN to a lower output voltage VOUT. The power converter 500 comprises an error amplifier 508 and a power conversion unit 510. The error amplifier 508 is similar to the error amplifier 308 and can generate an error result ER. The power conversion unit 510 comprises a comparator 512 and a power stage circuit 514. The comparator 512 compares a difference between the error result ER generated by the error amplifier 508 and a triangular wave TRG, to generate driving signals VDRV, VDRV_B for the power stage circuit 514, wherein the driving signal VDRV, VDRV_B have a specific duty cycle and are reverse to each other. The power stage circuit 514 comprises a high-side switch N1, a low-side switch N2, an inductor L and a capacitor C. The power stage circuit 514 switches connections between the input voltage VIN or the ground and inductor L according to the driving signals VDRV, VDRV_B, so as to convert the input voltage VIN to the suitable output voltage VOUT via the effect of the inductor L and the capacitor C. The dynamic voltage adjustment device 505 is similar to the dynamic voltage adjustment device 305, which can dynamically adjust a reference voltage of the dynamic voltage adjustment device 505 according to the different transmission voltage drops generated on the transmission line 502, to control the voltage difference across the load 504 to be stable. The detailed operations can be referred to the above, and is not described herein for simplicity.

Please refer to FIG. 6, which is a schematic diagram of a power transmission system 60 according to an embodiment of the present invention. The power transmission system 60 comprises a power converter 600, a transmission line 602, a load 604 and a dynamic voltage adjustment device 605. The dynamic voltage adjustment device 605 comprises the feedback circuit 306 and the adder circuit 307 shown in FIG. 3. Operating principles and the architectures of the transmission line 602, the load 604 and the dynamic voltage adjustment device 605 are substantially the same as those of the transmission line 302, the load 304 and the dynamic voltage adjustment device 305 of the power transmission system 30; therefore, the same component symbols are used. The power converter 600 is a Low-Dropout (LDO) linear power converter, which converts an input voltage VIN to a lower output voltage VOUT. The operations of the power converter 60 are well-known to those skilled in the art, and are not described herein for simplicity.

Please continue to refer FIGS. 7A-7D, which are schematic diagrams of different embodiments of the adder circuit 307 shown in FIG. 3, wherein the embodiments respectively utilizes one to three operational amplifiers for implementing the adder circuit 307, and the operation methods of the embodiments are well-known to those skilled in the art and are not described herein for simplicity. The adder circuit 307 can receive the original constant value reference voltage VREF of the power converter 300, the ground voltage GND of the power converter 300, and the load ground voltage LOAD_GND of load 304, to generate the dynamic reference voltage VREF' to the power converter 300. Note that, as long as the adder circuit 307 can acquire the reverse voltage difference ΔV2 via the load ground voltage LOAD_GND and the ground voltage GND and can accordingly generate the dynamic reference voltage VREF' to the power converter 300, the adder circuit 307 also can be implemented by different circuitry and is not limited to perform simple operations of addition and subtraction.

Noticeably, the spirit of the present invention is to directly sample the load output voltage but not to sample the output voltage. Therefore, the resistance voltage difference generated by the load current flows on the transmission line can be acquired, and the output voltage of the power converter can be dynamically adjusted such that the output voltage of the power converter has a function of the resistance voltage difference. Therefore, the output voltage can be dynamically adjusted corresponding to different resistance voltage differences under different load currents, to ensure the load can receive stable voltage. According to different applications, those skilled in the art can accordingly observe appropriate modifications and alternations. For example, the power transmission system of the present invention is not limited for switching power converters or linear power converters, but for different power converters, such as voltage regulators and power supplies, or any other applications needed to ensure the voltage of remote load staying stable. Furthermore, the resistances of the resistor R1, R2 of the feedback circuit 306 can be appropriately selected, such that the power converter 300 additionally outputs different output voltages VOUT to compensate the voltage difference of the transmission line 302.

To sum up, different from the conventional technologies which sample the output voltage as a feedback signal, the dynamic voltage adjustment device of the present invention samples voltages across the load, and thus the reference voltage of the power converter can be dynamically adjusted according to different transmission voltage drops of the transmission line, so as to control the voltage difference across the load to stay stable and to avoid the load being damaged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic voltage adjustment device, for dynamically adjusting an output voltage of a power transmission system which generates the output voltage according to a feedback signal and a reference signal and transmits the output voltage to a remote load via a transmission line to generate a load current, the dynamic voltage adjustment device comprising:
 a first signal terminal, for receiving a first signal of a forward transmission voltage drop corresponding to the transmission line;
 a second signal terminal, for receiving a second signal of a reverse transmission voltage drop corresponding to the transmission line;
 a third signal terminal, for receiving a reference voltage;
 a feedback circuit, coupled to the first signal terminal, for generating the feedback signal according to the first signal; and
 an adder circuit, for generating the reference signal according to the second signal and the reference voltage.

2. The dynamic voltage adjustment device of claim 1, wherein the transmission line comprises:
 a first input terminal, coupled to the output voltage;
 a second input terminal, coupled to a ground;
 a first output terminal, coupled to the remote load; and
 a second output terminal, coupled to a load-side ground.

3. The dynamic voltage adjustment device of claim 2, wherein the remote load is coupled between the first output terminal and the second output terminal, the first signal terminal is coupled to the first output terminal, and the second signal terminal is coupled to the second output terminal.

4. The dynamic voltage adjustment device of claim 2, wherein the forward transmission voltage drop is a voltage drop generated by the load current flows from the first input terminal to the first output terminal, and the reverse transmission voltage drop is a voltage drop generated by the load current flows from the second output terminal to the second input terminal.

5. The dynamic voltage adjustment device of claim 1, wherein the feedback circuit divides a voltage of the first signal to generate the feedback signal.

6. The dynamic voltage adjustment device of claim 1, wherein the adder circuit subtracts a voltage of the second signal to a voltage of a ground to obtain the reverse transmission voltage drop, and adds the reverse transmission voltage drop and the reference voltage to obtain the reference signal.

7. The dynamic voltage adjustment device of claim 1, wherein the power transmission system generates the output voltage according to a difference between the reference signal and the feedback signal.

8. A power transmission system, comprising:
   a remote load;
   a transmission line, for transmitting an output voltage to the remote load to generate a load current;
   a power converter, for generating the output voltage according to a feedback signal and a reference signal; and
   a dynamic voltage adjustment device, comprising:
      a first signal terminal, for receiving a first signal of a forward transmission voltage drop corresponding to the transmission line;
      a second signal terminal, for receiving a second signal of reverse transmission voltage drop corresponding to the transmission line;
      a third signal terminal, for receiving a reference voltage;
      a feedback circuit, coupled to the first signal terminal, for generating the feedback signal according to the first signal; and
      an adder circuit, for generating the reference signal according to the second signal and the reference voltage.

9. The power transmission system of claim 8, wherein the transmission line comprises:
   a first input terminal, coupled to the output voltage;
   a second input terminal, coupled to a ground;
   a first output terminal, coupled to the remote load; and
   a second output terminal, coupled to a load-side ground.

10. The power transmission system of claim 9, wherein the remote load is coupled between the first output terminal and the second output terminal, the first signal terminal is coupled to the first output terminal, and the second signal terminal is coupled to the second output terminal.

11. The power transmission system of claim 9, wherein the forward transmission voltage drop is a voltage drop generated by the load current flows from the first input terminal to the first output terminal, and the reverse transmission voltage drop is a voltage drop generated by the load current flows from the second output terminal to the second input terminal.

12. The power transmission system of claim 8, wherein the feedback circuit divides a voltage of the first signal to generate the feedback signal.

13. The power transmission system of claim 8, wherein the adder circuit subtracts a voltage of the second signal to a voltage of a ground to obtain the reverse transmission voltage drop, and adds a voltage of the reverse transmission voltage drop and a voltage of the reference voltage to obtain the reference signal.

14. The power transmission system of claim 8, wherein the power transmission system generates the output voltage according to a difference between the reference signal and the feedback signal.

* * * * *